Sept. 1, 1970 N. F. JUESCHKE 3,526,797
STABILIZING SPRING ASSEMBLY FOR BRUSHHOLDER
Filed Sept. 29, 1969 2 Sheets-Sheet 1

INVENTOR.
NORMAN F. JUESCHKE
BY *Edward W. Goebel*
HIS ATTORNEY

United States Patent Office 3,526,797
Patented Sept. 1, 1970

3,526,797
STABILIZING SPRING ASSEMBLY FOR
BRUSHHOLDER
Norman F. Jueschke, Erie, Pa., assignor to General
Electric Company, a corporation of New York
Continuation of application Ser. No. 738,998, June 21,
1968. This application Sept. 29, 1969, Ser. No. 863,678
Int. Cl. H02k 13/00
U.S. Cl. 310—245                  14 Claims

ABSTRACT OF THE DISCLOSURE

A brushholder for a dynamoelectric machine including a spring assembly having a backing member which is normally pivotably mounted within the brushholder and having a constant pressure spring of volute construction attached to the backing member. The force of the constant pressure spring against the top of the brush provides a moment of force about a pivot point which biases the backing member into engagement with a portion of the brush near a commutator of the motor. The backing member forces the brush against a reaction surface of the brushholder during a desired useful length of the brush to increase brush stability and improve commutation for the dynamoelectric machine.

BACKGROUND OF THE INVENTION

This invention relates to dynamoelectric machines, and more particularly, to spring assemblies for brushholders used in dynamoelectric machines.

It has long been desirable to provide a brushholder assembly which increases the mechanical stability with which a brush rides on a current collector surface or commutator of a dynamoelectric machine as the brush conducts energy between a stator and a rotor of the machine. Increased brush stability improves the commutating characteristics of the dynamoelectric machine and thus improves the performance of the machine. Lack of brush stability has been prevalent in reversible machines where changes in the direction of rotation have tended to periodically force a portion of the brush away from the commutator surface, causing the brush to "chatter." The many attempts which have been made to provide a satisfactory brushholder assembly, some of which are illustrated in U.S. Pats. 728,565, 2,488,788 and 2,532,827, have met with varying degrees of success.

Among the most successful types of brushholder assemblies are those which employ removable spring assemblies comprising a prestressed spring of volute construction which urges a brush against the current collector surface with a substantially constant pressure during the useful length of the brush. Constant pressure brushholders of this type are disclosed and claimed in Pats. 2,602,100, 2,836,745, 2,840,733, and 2,840,734, all of which are assigned to the Assignee of this invention. Constant pressure brushholders have been used with a great deal of satisfaction in that they have resulted in increased mechanical brush stability and thus in improved commutation for dynamoelectric machines in which they are used.

At times the stability of the brushes mounted in constant pressure brushholders has been even more improved by mounting the brushholders at an angle with respect to the current collector surface, usually an angle of about 15° to about 30°. The force of the prestressed volute spring is then divided into two components, one of which holds the brush onto the face of the current collector and the other of which holds the brush against a reaction surface of the brushholder to increase brush stability. While mounting the brushes of a machine in this manner usually results in highly satisfactory commutation characteristics for the machine, occasionally a worn brush, a rough current collector surface, or a change in the direction of rotation of the rotor may cause the brushes to chatter. Furthermore, the useful brush length is reduced by mounting the brushes at the angles referred to above, since the angle of brush mounting shortens one of the longitudinal dimensions of the brush.

Thus it is an object of this invention to provide an improved brushholder spring assembly wherein a prestressed spring of volute construction biases a brush against a current collector surface with a high degree of stability.

It is another object of this invention to provide a spring assembly for a brushholder of a dynamoelectric machine wherein the force of a prestressed spring of volute construction causes another portion of the spring assembly to inhibit the movement of the brush away from a current collector surface of the dynamoelectric machine, thereby improving the commutating characteristics of the dynamoelectric machine.

It is still another object of this invention to provide a spring assembly for a brushholder in which a prestressed spring of volute construction provides forces which bias a brush against the face of a current collector surface during rotation of the rotor of the dynamoelectric machine in the both directions, without the need for mounting the brushholder at a substantial angle with respect to the face of the current collector surface to provide these forces.

SUMMARY OF THE INVENTION

Briefly stated, and in accordance with one aspect of this invention, a spring assembly for a brushholder adapted to be mounted in a dynamoelectric machine comprises a prestressed spring of volute construction and a backing means. The prestressed spring is secured to the backing means so that the spring urges a brush against a current collector surface of the dynamoelectric machine with a substantially constant force during a desired useful length of the brush. The backing means includes means for pivotally engaging a portion of the brushholder to retain the spring assembly within the brushholder. The spring assembly is also caused to pivot within the brushholder while the prestressed spring engages the brush during the normal operation of the machine so that a portion of the backing means is biased into engagement with the brush to force the brush against a reaction surface of the brushholder, thereby increasing brush stability.

The novel features of this invention are set forth with particularity in the appended claims. The organization and manner of operation of the invention, together with further objects and advantages thereof, can be best understood by referring to the following description, taken in conjunction with the accompanying drawings.

BRIEF DESCRIPTION OF THE DRAWINGS

Referring now in more detail to the drawings, FIG. 1 shows a brushholder and spring assembly 10 comprising a brushholder 12 and unitary spring assembly 14 which coact to urge a brush 16 against a face or surface 18 of a current collector, such as a commutator 20, of a dynamoelectric machine. The brush 16 itself is mounted in a channel 21 of the brushholder 12 for longitudinal movement toward the commutator 20. For convenience, the commutator 20 will be referred to as rotating in a direction indicated by an arrow 22. It can, of course, rotate in the opposite direction as well. The structure of the spring assembly and the fact that this assembly is pivotably mounted within the brushholder 12 increase the mechanical stability with which the brush 16 is mounted against the face 18 of the commutator 20.

Figure 1:
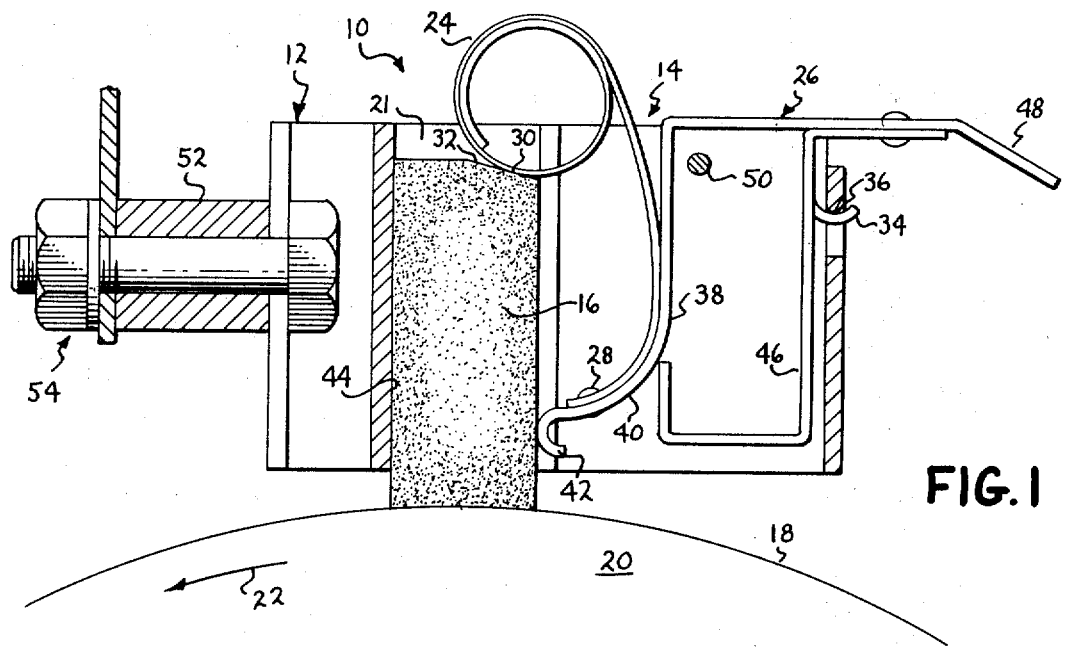
FIG. 1 is a view in elevation, partially broken away, of a brushholder and spring assembly made in accordance with the principles of this invention.

The spring assembly 14 basically comprises a prestressed spring of volute construction 24 and backing means 26. Means are provided, such as a rivet 28, for rastening the prestressed spring 24 to the backing means 26 so that the prestressed spring can make contact with an area 30 on a sloping surface 32 at the top of the brush 16 as shown. Alternatively, the prestressed spring 24 can be connected to the backing means 26 by a weld or in any other convenient manner.

The backing means 26 include means for pivotally engaging a portion of the brushholder 12 to retain the spring assembly 14 within the brushholder. This pivotally engaging means may comprise, by way of example, a pivot tab 34 which pivotally engages a rounded edge 36 provided for this purpose at one side of the brushholder 12. The tab 34 allows the spring assembly 14 to pivot within the brushholder 12 while the prestressed spring 24 engages the sloping surface 32 of the brush 16 during the normal operation of the dynamoelectric machine.

The backing means 26 further includes means such as bearing surface 42 biased into engagement with the brush 16 by a moment of force about the pivot tab 34 and edge 36. The backing means 26 includes a spring receiving portion 38 having one end of the spring 24 riveted to a curved area 40, with the bearing surface 42 at the end of this portion 38.

Thus, in accordance with this invention, the moment of force about the pivot tab 34 and the rounded edge 36 due to the prestressed spring 24 causes the spring assembly 26 to pivot within the brushholder 12. The bearing surface 42 is biased against one side of the brush 16. The opposite side of the brush 16 is biased against a reaction surface 44 of the channel 21 during the desired useful length of the brush.

Due to the pressure of the prestressed spring 24 against the sloped surface 32 of the brush 16, the bottom surface of the brush 16 is urged against the surface 18 of the commutator 20 and the upper end of the brush 16 is urged against the reaction surface 44 of the channel 21. Due to the pressure of the bearing surface 42 against the lower end of the brush 16 near the commutator, the lower end of the brush 16 is biased against the reaction surface 44. Since both ends of the brush are biased against the reaction surface 44 by the spring 24, the brush 16 is inhibited from slightly lifting from the surface 18 of the commutator 20 if the brush should move slightly away from surface 44 due to the clearance of the brush in the channel 21. The mechanical stability of the brush 16 is thus increased, improving the commutation characteristics of a dynamoelectric machine in which the brushholder and spring assembly 10 of this invention is used.

Figure 2:
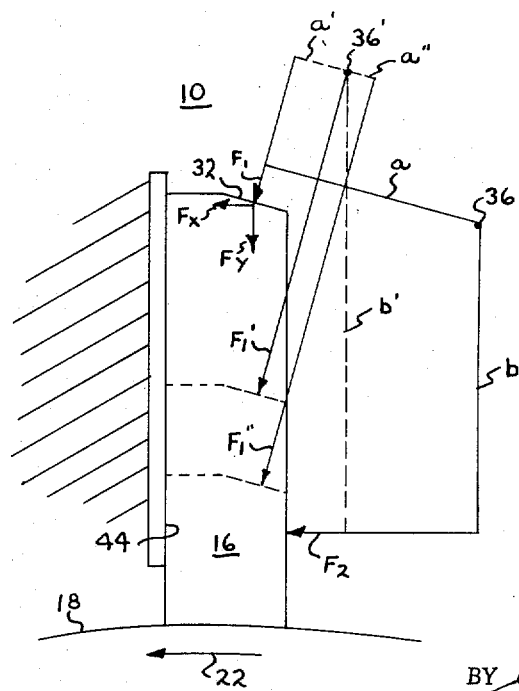
FIG. 2 is a schematic diagram showing the forces and moments about a pivot point of a spring assembly of this invention which tend to mechanically stabilize a brush for a dynamoelectric machine.

The schematic diagram of the brushholder assembly 10 in FIG. 2 shows a resolution of the forces imposed on the brush 16 by the brushholder spring assembly 14 of this invention. The arrow marked $F_1$ shows the force which the prestressed spring 24 of FIG. 1 applies to the sloping surface 32 at the top of the brush 16. This force can be resolved into two components, the first of which marked $F_x$ presses a top portion of the brush 16 against the reaction surface 44 and a second of which marked $F_y$ presses the bottom surface of the brush 16 against the surface 18 of the commutator 20. These forces remain substantially constant during the desired useful life of the brush due to the structure of the prestressed spring 24. The moment of force about 36 is equal to the product of the force $F_1$ and the length of a line drawn perpendicular to the direction of the force $F_1$ to the pivot 36, the length being marked $a$ in FIG. 2.

The arrow marked $F_2$ represents the force applied to the lower end of the brush 16 by the bearing surface 42 in FIG. 1. The moment of force about the pivot 36 can also be computed as the product of the force $F_2$ times the length of a perpendicular distance $b$ between this force and the pivot 36. It is equal and opposite to the moment of force caused by the force $F_1$.

The arrows $F_1'$ and $F_1''$ represent the forces of the prestressed spring against the top surfaces of worn brushes, with the brushes being shown in dotted lines. It will be observed that the length of the moment arm $a$ between each force and the pivot 36 decreases as the brush 16 wears during use. Since the pressure of the prestressed spring remains substantially constant during its use and since the length of the moment arm $b$ remains constant because it represents the relatively solid structure of the backing means 26, a force of $F_2$ against the bottom portion of the brush 16 decreases with brush wear in proportion to the decreasing length of the moment arm $a$. However, decreases in the force $F_2$ against the lower portion of the brush 16 have not been found to appreciably affect the increased stability caused by the application of this force to the brushholder.

It is imperative that the position of the pivot 36 is chosen so that the moment arm $a$ exists in the proper direction to cause the force $F_2$ to be applied to the lower portion of the brush 16 during the desired useful length of the brush 16. If the moment arm $a$ should cease to exist, the force $F_1$ of the prestressed spring 24 would not provide a moment of force about the pivot 36. Without a moment about pivot 36 there would be no force $F_2$ applied to the lower portion of the brush 16. To illustrate this condition a second pivot point 36' has been chosen. When the brush has worn to the extent that the force $F_1'$ is applied to the higher dotted line in FIG. 2, there is no moment about the pivot 36' and thus there is no force $F_2$ to hold the bottom portion of the brush 16 against the reaction surface 44.

Furthermore, if the moment arm $a$ should extend to the opposite side of the pivot from that discussed above, the moment of force would be in the opposite direction from that shown in FIG. 2 and the backing means 26 of FIG. 1 would be forced against a side of the brushholder 12 which is facing the reaction surface 44.

This condition is illustrated again with reference to the second pivot point 36' as it relates to the force $F_1''$ which is applied to the lower dotted representation of the surface of a worn brush. In this instance, the moment arm between the force $F_1''$ and the pivot 36' comprises the length $a''$. Since $a''$ extends in a direction from the pivot 36' opposite from that of $a'$, the moment about pivot 36' changes its direction as well to counterclockwise about the pivot. The force $F_2$ is no longer applied to the lower portion of the brush 16.

The brushholder and spring assembly 10 of FIG. 1 also includes numerous other features which add to its utility and reliability. For example, the fact that the prestressed spring 24 is fastened to the curved portion 40 of the spring receiving member of the backing means 26 relieves the strain on the prestressed spring at the point at which it is fastened to the curved portion 40 of member 38. This will prevent the spring from snapping off the member 38 after long continued use of the brushholder and spring assembly.

Figure 3:
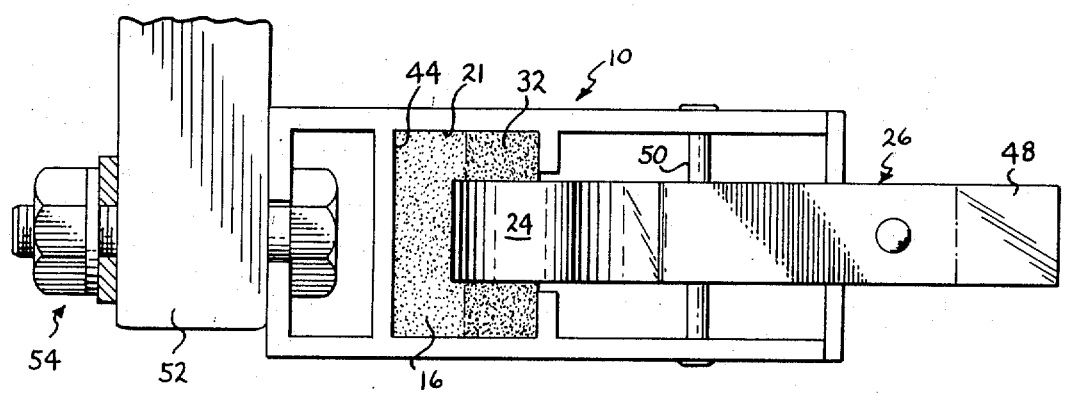
FIG. 3 is a plan/view of the brushholder and spring assembly shown in FIG. 1.
Figure 4:
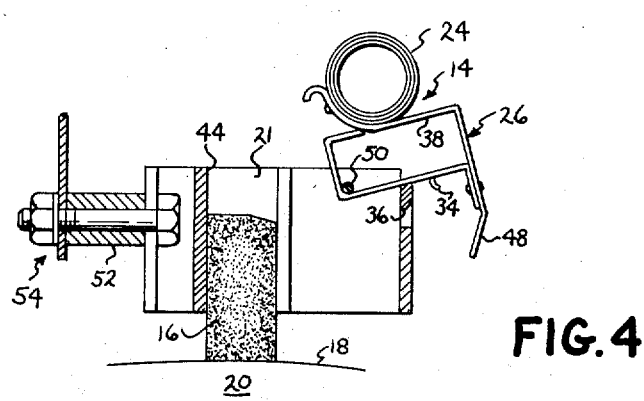
FIG. 4 is a view in elevation, partially broken away, showing a captive arrangement of the spring assembly at a time when a new brush is being inserted in the brushholder.

Referring to FIGS. 1, 3, and 4, the brushholder and spring assembly 10 also includes means for locking the spring assembly onto the brushholder to make the spring assembly captive during brush replacement. In the present embodiment of this invention, a backing member 46 is riveted, welded, or otherwise affixed to a handle extension 48 of the member 38. The other end of the backing member 46 is reversely bent so that it engages one side of the member 38 with a small amount of pressure. A pin 50 is mounted between opposite sides of the brushholder 12 and the sides of the backing means 26 are mounted about the pin 50 when the brushholder assembly 14 is within the brushholder 12.

Figure 5:
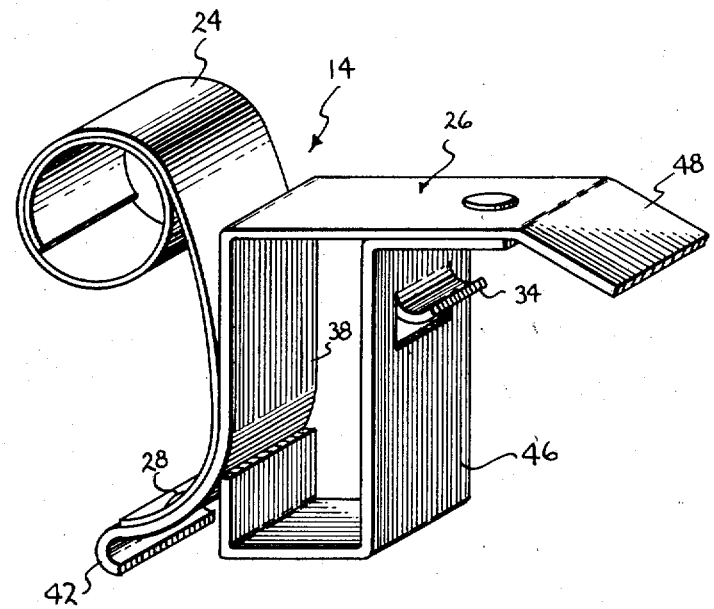
FIG. 5 is a perspective view of the spring assembly shown in FIGS. 1, 3, and 4.

To remove the spring assembly 14 from its normal operating position, the pivot tab 34 is moved out of contact with the rounded pivot edge 36 so that the pivot tab 34 no longer retains the spring assembly 14 in the normal operating position. The spring assembly 14 can be lifted partially out of the brushholder, with the pin 50 holding the spring assembly 14 captive within the brushholder 12 while this spring assembly is out of its normal operating position as shown in FIG. 4. It will be recognized that the spring assembly 14 can be readily fully removed from the brushholder by forcing the pin 50 between the area near the curved portion of the member 38 where the backing member 46 makes contact with the member 38. The perspective view of the spring assembly in FIG. 5 gives a clear picture of the structure of this spring assembly.

The brushholder and spring assembly 10 can be fastened to a supporting structure 52, as by the bolt assembly 54 shown in FIG. 1 or by other appropriate apparatus.

This invention is not limited to the details shown in the preferred embodiment which is illustrated and described herein. Those skilled in the art will recognize that many modifications can be made to the spring assembly within the spirit and scope of this invention. For example, it is possible that the structure of the spring assembly 14 itself can be modified in any number of ways in which the backing means 26 or an equivalent is still caused to pivot about some pivot points by the force of a prestressed spring of volute construction on a brush. Furthermore, the pivot point itself may change from an edge on the brushholder to some other means such as a pin mounted within the brushholder.

Further modifications may be made in the spring assembly and brushholder, such as providing the bearing surface 42 with a substantially friction free surface, as by means of a Teflon coating for this surface. The axis of the brush 16 can extend in a radial direction with respect to the commutator 20, or it may extend off at some angle with respect to the radius of the commutator as a "reaction type" of brush mounting arrangement.

It is thus intended that the appended claims cover such modifications and applications which are within the spirit and scope of this invention.

What I claim as new and desire to secure by Letters Patent of the United States is:

1. A spring assembly for use with a brushholder which is adapted to be mounted in a dynamoelectric machine, the brushholder including a channel for receiving a brush arranged for longitudinal movement therein toward a current collector surface of the dynamoelectric machine, with a first side of the channel having a longitudinal opening for receiving the spring assembly and the opposite side of the channel comprising a reaction surface, said spring assembly comprising, in combination:
   (a) a prestressed spring of volute construction;
   (b) backing means and means for securing said prestressed spring to said backing means to cause said prestressed spring to exert a substantially constant force against the brush while the brush is of a desired useful length to urge the brush against the current collector surface;
   (c) said backing means including means for pivotally engaging a portion of the brushholder to retain said spring assembly within said brushholder and to cause said spring assembly to pivot within the brushholder by the force of said prestressed spring engaging the brush during the normal operation of the dynamoelectric machine; and
   (d) said backing means including means biased into engagement with the brush by a moment of force about said means for pivotally engaging a portion of the brushholder to force the brush against the reaction surface of the brushholder during the desired useful length of the brush.

2. A spring assembly according to claim 1 wherein said means for pivotally engaging a portion of the brushholder is located at a position which causes said means biased into engagement with the brush to force the brush against the reaction surface of the brushholder for at least the wearing time of substantially the full length of the brush.

3. A spring assembly according to claim 1 wherein said prestressed spring engages a surface of the brush removed from the current collector surface of the dynamoelectric machine to force an end of the brush removed from the current collector surface against the reaction surface of the channel and said means biased into engagement with the brush comprises a bearing surface which contacts the brush near the current collector surface.

4. A spring assembly according to claim 1 wherein said backing means includes a curved portion turned inwardly toward the brush near the current collector surface, with said prestressed spring being attached to said curved portion to relieve the strain created by the spring at the point of attachment, and said means biased into engagement with the brush comprising a bearing surface at the end of said curved portion.

5. A spring assembly according to claim 1 which also includes means for engaging a portion of the brushholder after removal of said means for pivotally engaging a portion of the brushholder from this engagement to prevent said prestressed spring from forcing said spring assembly totally away from the brushholder.

6. A spring assembly for use with a brushholder which is adapted to be mounted in a dynamoelectric machine, the brushholder including a channel for receiving a brush arranged for longitudinal movement therein toward a current collector surface of the dynamoelectric machine, with a first side of the channel having a longitudinal opening for receiving the spring assembly and the opposite side of the channel comprising a reaction surface, said spring assembly comprising, in combination:
   (a) a prestressed spring of volute construction;
   (b) backing means, and means for securing said prestressed spring to said backing means at a point on said backing means near said current collector surface during the normal operation of the dynamoelectric machine to cause said prestressed spring to exert a substantially constant force against the brush while the brush is of a desired useful length to urge the brush against the current collector surface;
   (c) said backing means including a curved pivot surface which pivotally engages the brushholder to retain said spring assembly within said brushholder and to cause said spring assembly to pivot within the brushholder by the force of said prestressed spring engaging the brush during the normal operation of the dynamoelectric machine; and
   (d) said backing means including a bearing surface which engages the brush at a location near the current collector surface of the dynamoelectric machine due to a moment of force about said rounded pivot surface to force the brush against the reaction surface of the brushholder during the desired useful length of the brush.

7. A spring assembly according to claim 6 wherein said bearing surface is located on an extension of said backing means which is inwardly directed toward the brush during the normal operation of the dynamoelectric machine.

8. A spring assembly according to claim 6 which also includes means for engaging a portion of the brushholder after removal of said curved pivot surface from engagement with the brushholder to prevent said prestressed spring from forcing said spring assembly totally away from the brushholder.

9. A spring assembly according to claim 6 wherein said curved pivot surface is located at a position which causes said bearing surface to force the brush against the reaction surface of the brushholder for at least the wearing time of substantially the full length of the brush.

10. A spring assembly according to claim 6 wherein said backing means comprises a spring receiving member having said prestressed spring secured thereto and including a backing member having said curved pivot surface located thereon; said backing means also including means for fastening said spring receiving member to said backing member to form a closed assembly which engages a portion of the brushholder after removal of said curved pivot surface from engagement with the brushholder to prevent said prestressed spring from forcing said spring assembly totally away from the brushholder.

11. A brushholder and spring assembly for use in a dynamoelectric machine, comprising, in combination:
  (a) a brushholder including a channel for receiving a brush arranged for longitudinal movement therein toward a current collector surface of the dynamoelectric machine when said brushholder is mounted in the dynamoelectric machine, a first side of said channel having a longitudinal opening for receiving a spring assembly and the opposite side of said channel comprising a reaction surface, said brushholder further including a pivot surface;
  (b) a prestressed spring of volute construction;
  (c) backing means and means for securing said prestressed spring to said backing means to cause said prestressed spring to exert substantially constant force against the brush while the brush is of a desired useful length to urge the brush against the current collector surface;
  (d) said backing means further including means for pivotally engaging said pivot surface of said brushholder to retain said spring assembly within said brushholder and to cause said spring assembly to pivot within said brushholder by the force of said prestressed spring engaging the brush during the normal operation of the dynamoelectric machine; and
  (e) said backing means including means biased into engagement with the brush by a moment of force about said pivot surface to force the brush against said reaction surface of said brushholder during the desired useful length of the brush.

12. A brushholder and spring assembly according to claim 11 wherein said pivot surface is engaged by said means for pivotally engaging said pivot surface at a position which causes said means biased into engagement with the brush to force the brush against the reaction surface of said brushholder for at least the wearing time of substantially the full length of the brush.

13. A brushholder and spring assembly according to claim 11 wherein said prestressed spring engages a surface of the brush removed from the current collector surface of the dynamoelectric machine to force an end of the brush removed from the current collector surface against the reaction surface of said channel and said means biased into engagement with the brush comprises a bearing surface which contacts the brush near the current collector surface during the normal operation of the dynamoelectric machine.

14. A brushholder and spring assembly according to claim 11 which also includes means for engaging a portion of said brushholder after removal of said means for pivotally engaging said pivot surface from engagement with said pivot surface to prevent said prestressed spring from forcing said spring assembly totally away from said brushholder.

References Cited
UNITED STATES PATENTS

| | | | |
|---|---|---|---|
| 662,758 | 11/1900 | Bishop | 310—245 |
| 2,695,968 | 11/1954 | Welch et al. | 310—246 |
| 2,727,165 | 12/1955 | Schaffer | 310—239 |
| 2,974,241 | 3/1961 | Harter | 310—246 |
| 3,133,218 | 5/1964 | Harris | 310—242 |

MILTON O. HIRSHFIELD, Primary Examiner

L. L. SMITH, Assistant Examiner